7615X
J. S. Bishop,
Cutting Leather.
Patented June 29, 1833.
NO PRINTED COPY OF SPECIFICATION IN OFFICE.
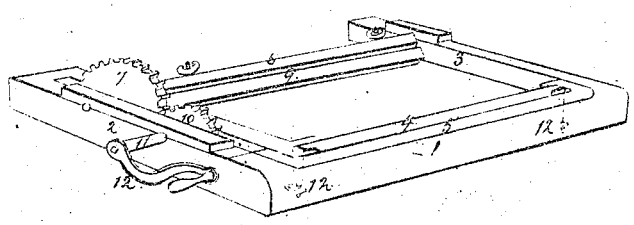

MISSING PAGE TEMPORARY NOTICE

PATENT # 7615X FOR ISSUE DATE 6-29-1833

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All Text